(12) United States Patent
Hein

(10) Patent No.: US 9,950,678 B2
(45) Date of Patent: Apr. 24, 2018

(54) VEHICLE BODY

(71) Applicant: GM GLOBAL TECHNOLOGY OPERATIONS LLC, Detroit, MI (US)

(72) Inventor: Friedrich Hein, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 15/087,175

(22) Filed: Mar. 31, 2016

(65) Prior Publication Data

US 2016/0288736 A1 Oct. 6, 2016

(30) Foreign Application Priority Data

Apr. 2, 2015 (DE) .................. 10 2015 004 413

(51) Int. Cl.
*B60R 13/04* (2006.01)
(52) U.S. Cl.
CPC .................... *B60R 13/04* (2013.01)
(58) Field of Classification Search
CPC .... B29C 66/038; B29C 66/0384; B60R 13/04
See application file for complete search history.

(56) References Cited

U.S. PATENT DOCUMENTS

| 5,938,274 | A | 8/1999 | Ehrlich | |
|---|---|---|---|---|
| 7,954,885 | B2 * | 6/2011 | Sase | B60R 13/04 296/191 |
| 8,348,321 | B2 * | 1/2013 | Yamazaki | B60R 13/06 296/1.08 |
| 8,523,272 | B1 * | 9/2013 | Pettus | B62D 25/16 296/187.02 |
| 8,910,987 | B1 * | 12/2014 | Greggs | B60R 13/04 296/1.08 |
| 9,033,387 | B2 | 5/2015 | Schulte et al. | |
| 9,102,357 | B2 * | 8/2015 | Watanabe | B62D 25/02 |
| 9,511,739 | B2 * | 12/2016 | Thomas | B60R 21/36 |
| 9,821,855 | B2 * | 11/2017 | Rogge | B62D 25/04 |
| 2003/0015882 | A1 * | 1/2003 | Nagae | B60R 19/24 296/29 |
| 2011/0089719 | A1 | 4/2011 | Yamazaki et al. | |
| 2016/0325696 | A1 * | 11/2016 | Rogge | B60R 13/04 |

FOREIGN PATENT DOCUMENTS

| CN | 202827080 U | 3/2013 |
|---|---|---|
| CN | 204701574 U | 10/2015 |
| DE | 10328455 A1 | 1/2005 |

OTHER PUBLICATIONS

Great Britain Patent Office, Great Britain Search Report for Great Britain Application No. 1603974.5, dated Jul. 29, 2016.
German Patent Office, German Search Report for German Application No. 102015004413.3, dated Oct. 28, 2015.

* cited by examiner

*Primary Examiner* — D Glenn Dayoan
*Assistant Examiner* — Paul Chenevert
(74) *Attorney, Agent, or Firm* — Lorenz & Kopf LLP

(57) ABSTRACT

Two outer skin parts of a vehicle body border one another at a joint. The first outer skin part includes an apron which engages in the interior of the vehicle body and overlaps with the second outer skin part. A screen engages with a guiding contour of the apron running in the direction of the joint from an end of the joint between the apron and the second outer skin part.

17 Claims, 3 Drawing Sheets

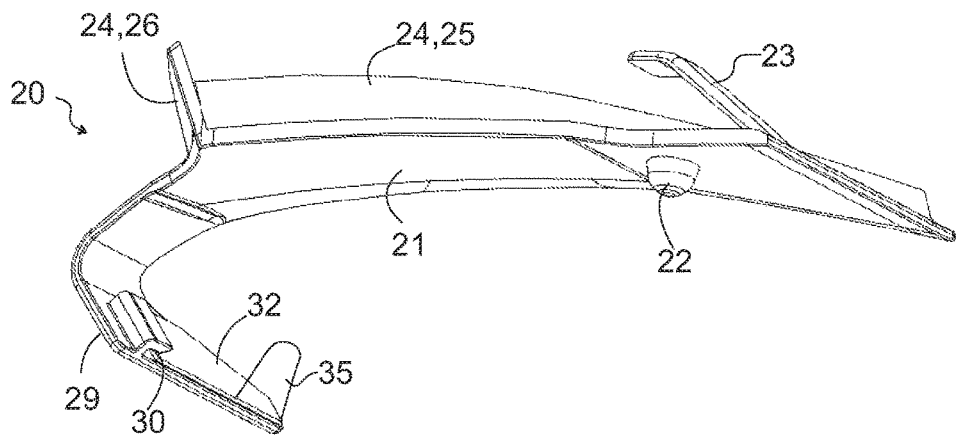
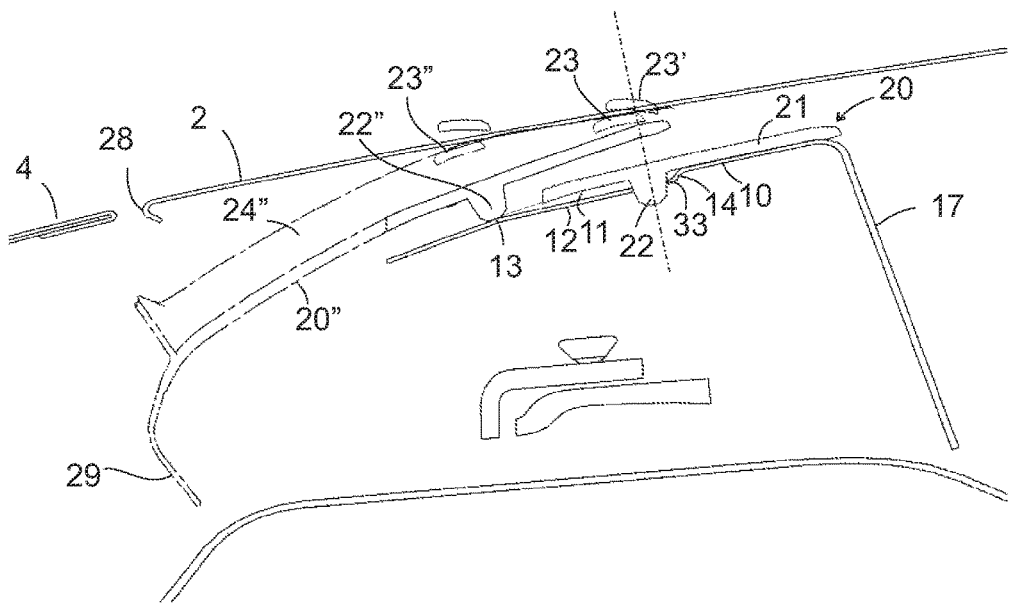

VEHICLE BODY

CROSS-REFERENCE TO RELATED APPLICATION

This application claims priority to German Patent Application No. 102015004413.3, filed Apr. 2, 2015, which is incorporated herein by reference in its entirety.

TECHNICAL FIELD

The present disclosure pertains to a vehicle body, in particular a passenger car body.

BACKGROUND

The bodies of motor vehicles usually include multiple outer skin parts, which can be part of a supporting structure of the body or serve to cover the same. For various reasons, such outer skin parts are not mounted directly abutting one another but their visible parts are in each case spaced from one another by joints of several millimeters width, one of the outer skin parts having an apron which engages into the interior of the vehicle body where it projects under an edge region bordering the joint.

Usually, a motor vehicle body is painted by spraying after the assembly. When first and second outer skin part are to be painted differently, in particular in different colors, one of the outer skin parts, which is already painted, has to be covered during the painting of the other skin part. Such a cover cannot be placed in the joint not only because of the large amount of work connected with this but because such a cover would prevent the formation of a closed coat of paint on the apron and thus not offer effective corrosion protection. Consequently, paint can enter the joint during both painting steps. On the other hand it is not desirable either that a transition between the various paint applications is visible in the joint. In order to conceal such a transition, a screen can be mounted in the joint but when, in order to achieve a positively joined anchoring of the screen in the joint, one of the outer skin parts has to be detached again, this brings with it a substantial amount of work and the risk of damaging the fresh paintwork.

SUMMARY

The present disclosure provides a vehicle body having two bordering outer skin parts, in the case of which a screen can be easily and quickly mounted in the joint. According to a configuration of the present disclosure, the motor vehicle body includes two outer skin parts bordering one another at a joint. The first outer skin part includes an apron which engages into the interior of the motor vehicle body and overlaps with the second outer skin part. A screen in engagement with a guiding contour of the apron extending in the direction of the joint is pushed in between the apron and the second outer skin part. Such a construction makes possible mounting the screen by pushing in from an end of the joint so that it is not required to detach one of the outer skin parts in order to thereby render the joint wide enough for inserting the screen. The possibility of mounting a screen in a simple and cost-effective manner created in this way additionally makes it economical to mount the screen also between uniformly painted outer skin parts, for example in order to minimize the passage of headwind or precipitation water through the joint into the vehicle interior.

A stop position can be predetermined up to which the screen can be pushed in between the apron and the second outer skin part. The apron and the screen can include engagement means which interact in this stop position in order to prevent or at least render more difficult pulling the screen back out of the joint again. The stop position can be predetermined by a wall or an edge at an end of the guiding contour which the screen abuts and which prevents further advancing of the screen in the intermediate space between the apron and the second outer skin part. In this stop position, the screen can still be rotatable about an axis which runs through the end of the guiding contour.

In order to unambiguously determine the position of the screen on the finished vehicle body, the screen can additionally carry a hook which abuts an edge of one of the outer skin parts that runs transversely to the joint.

Furthermore, gluing, in particular by way of a double-sided adhesive tape, can serve for fixing the screen, in particular for preventing a rotation about the axis mentioned above.

The guiding contour can be a groove in which a projection of the screen engages. Such a groove can be created with the same operation when the first outer skin part is molded from a metal sheet.

When in the stop position the screen abuts at the end of the guiding contour, a rotation of the screen about an axis running through this end of the guiding contour can still be possible as mentioned above. In order to unambiguously fix the position of the screen on the finish-assembled vehicle body, a second stop is then additionally required. In order to form this stop, the screen can carry a hook which by rotating the screen about the axis can be brought to abut an edge of one of the outer skin parts running transversely to the joint, typically the first outer skin part.

Additionally or complementarily to the stops explained above, the screen can be fixed by gluing. In particular, the bond can be imparted by a double-sided adhesive tape.

In order to be able to keep the intermediate space between the apron and the second outer skin part to be filled out by the screen narrow, the guiding contour should be a groove in which a projection of the screen engages.

On a pocket end, the groove can be locally deepened or the apron can include a break-through in order to engage the projection of the screen there. A base plate of the screen can contact the apron and cover a bottom of the joint. A spring lug projecting from the base plate can be kept under tension through contact with the second outer skin part in order to thus keep the base plate pressed against the apron of the first outer skin part.

A bulkhead can project from the base plate to the second outer skin part in order to at least close off the intermediate space and the apron and the second outer skin part and block the view from the outside in the parts of the intermediate space located on the other side of the bulkhead. The course of the bulkhead should follow the course of an edge of the second outer skin part delimiting the joint.

The first outer skin part can in particular be an outer wall of a pillar carrying a roof of the vehicle. As second outer skin part, a fender of the vehicle body is possible in particular. A moveable flap, in particular an engine compartment hood, a trunk lid or a door of the vehicle body can border an end of the joint. From this end it is generally particularly easy to introduce the screen when the relevant flap is opened.

BRIEF DESCRIPTION OF THE DRAWINGS

The present disclosure will hereinafter be described in conjunction with the following drawing figures, wherein like numerals denote like elements.

FIG. 3 is a perspective view of a screen;

FIG. 4 is a section along an approximately horizontal plane through the lower end of the outer wall and a region of the fender overlapping with the same, wherein the screen is once shown en route into its stop position and once in stop position on the outer wall;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
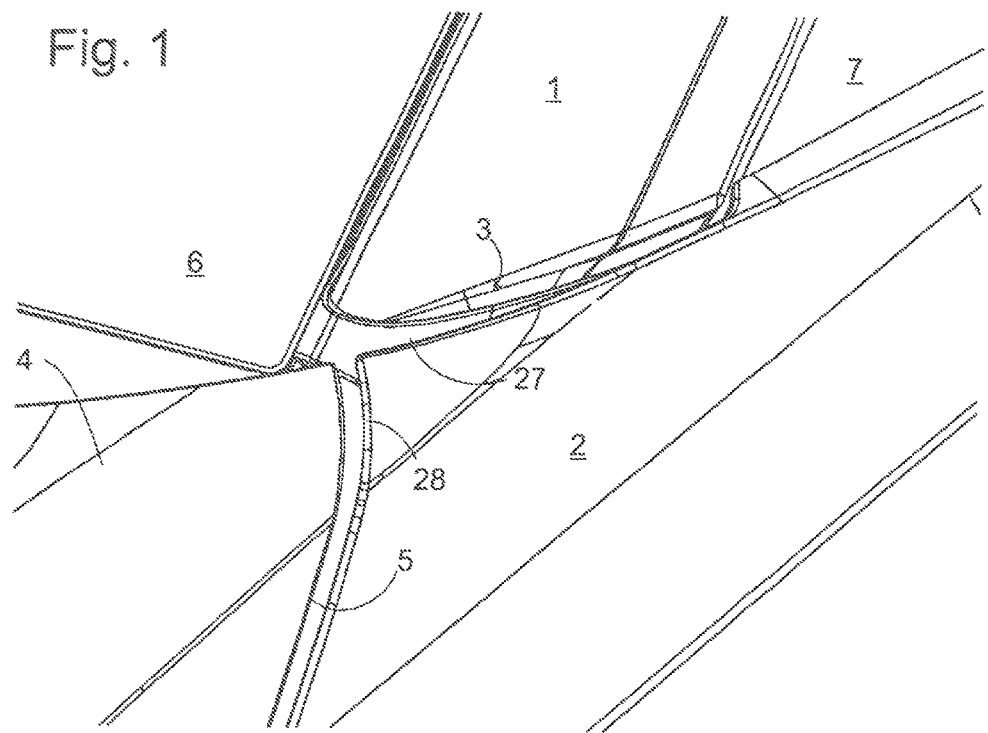
FIG. 1 is a perspective outside view of a part of a motor vehicle body, in which an A-pillar, a fender, a windshield and an engine hood border one another.

FIG. 1 shows in a perspective view a detail of a vehicle body. Visible are the lower end of an outer wall 1 of an A-pillar, a part of a fender 2, which is separated from the outer skin 1 by a joint 3, a rear corner of an engine hood 4, separated from the fender 2 by a further joint 5, a windshield 6 and a side window 7 fixed to the body. A door borders the fender 2 and the side window 7 outside the shown image extract.

Figure 2:
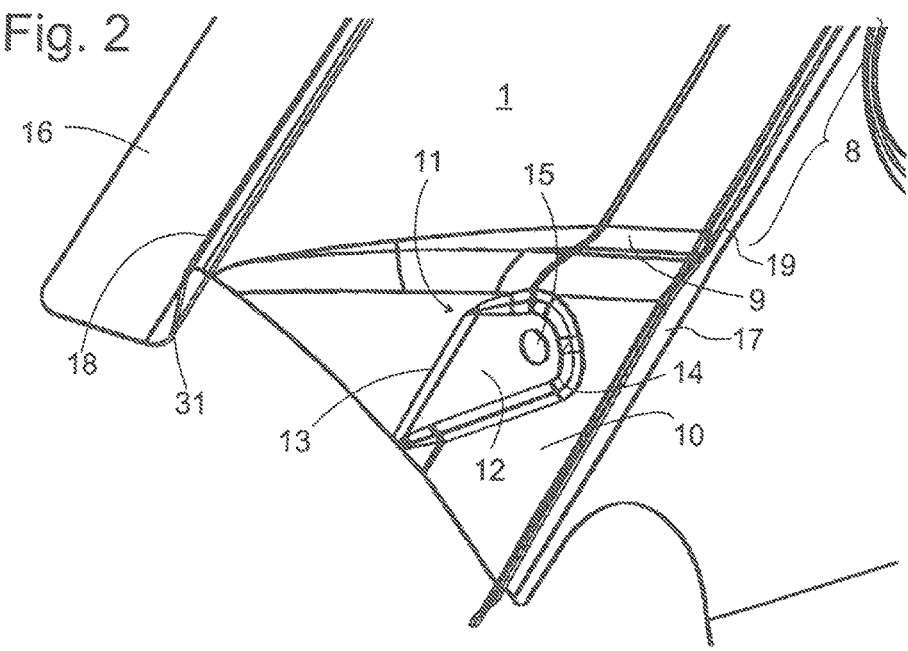
FIG. 2 is an enlarged view of the lower end of an outer wall of the A-pillar.

FIG. 2 shows the lower end of the outer wall 1 on its own, seen from a viewpoint that is located slightly lower than in the case of FIG. 1. Accordingly, a step 9, which is oriented approximately horizontally and extends from the exposed region 8 into the interior of the body, is visible on the lower end of an exposed region 8 of the outer wall 1. An apron 10 which in this case is approximately triangular extends from an inner edge of the step 9 approximately vertically downwards. A groove 11 is stamped into the apron 10. The groove 11 is open towards the front, its bottom 12 merges into the apron 10 at a folding line 13 at an obtuse angle. The end of the groove 11 located opposite is closed off pocket-like by a front wall 14. Furthermore, a hole 15 is formed in the bottom 12 at the end.

The longitudinal edges of the outer wall 1 are formed by elongated flanges 16, 17 which with respect to the exposed region 8 are offset by steps 18 and 19 respectively into the end of the body. The flanges 16, 17 each form a part of an enclosure of the windshield 6 respectively the side window 7.

FIG. 3 shows in a perspective view a screen 20 injection-molded from plastic, which is provided for attachment in the joint 3 between the outer wall 1 and the fender 2. A base plate 21 of the screen 20 has an elongated shape in longitudinal direction of the joint 3 and is gently curved in order to closely hug the surface of the apron 10. Adjacent to the right end of the base plate 21 in FIG. 4, a dome-shaped projection 22 is formed on its concave inside. On the convex outside, a lug-shaped spring 23 projects opposite the projection 22. In the perspective of FIG. 3 on the other side of the spring 23, a bulkhead 24 projects from the outside. The bulkhead 24 includes two legs 25, 26, which are oriented approximately at a right angle to one another and merge into one another by way of a curved section facing away from the beholder in FIG. 4. When the screen 20 is mounted, the leg 25 extends at a front upper edge 27 (see FIG. 1) some millimeters below an upper edge 27 (see FIG. 1) of the fender 2 and parallel to the same, the leg 26 runs approximately parallel to a front edge 28 of the fender 2 and is offset towards the back by some millimeters with respect to the same in vehicle longitudinal direction.

The longitudinal end of the base plate 24 facing away from the projection 22 and the spring 23 merges into a greatly curved section in a plate 29 which is provided in order to lie against the step 18 of the outer wall facing the windshield 6 in the finish-assembled state. A hook 30 formed on the inside of the plate 29 engages about the lower edge 31 of the step 18 in the assembled state (see FIG. 2) in order to keep a piece of two-sided adhesive tape 32, which is attached on the strap 35 adjacent to the hook 30, pressed against the step 18.

FIG. 4 shows a section along a substantially horizontal plane through the apron 10 of the outer skin 1 and an upper edge region of the fender 2 overlapping with this apron 10 in vertical direction. The screen 20 is shown twice in FIG. 4, once in the finish-assembled position and once during its assembly. In the finish assembled state the base plate 21 closely hugs the apron 10, merely in the region of the groove 11 is there an open gap between its bottom 12 and the base plate 21. The projection 22 is engaged in the hole 15. The spring 23 is elastically deflected in contact with the fender 2; in the relaxed position it would cross the section plane at the cross section marked 23'. Of the finish-assembled screen 20, only those parts which are located in the section plane proper are shown in the figures. Parts which are located behind that are only visible in the representation of the not yet finally assembled screen, marked 20" here and shown as dashed outlines.

Here, the screen 20" is just pushed into the joint 3 from the front, i.e. from the edge of the fender 2 bordering the engine hood 4. This front end of the joint 3 is easily accessible when the engine hood 4 is opened.

The screen 20" is shown in a position in which its projection 22" is located directly at the entry of the groove 11 and touches the folding line 13. The spring 23" is greatly deflected. A contact of the bulkhead 24" with the fender 2 limits the deflection of the spring 23" so that the same during the pushing-in into the joint 3 is protected against breaking.

Just before reaching the front wall 14 of groove 11, the projection 22 engages in the hole 15 and a stop of the projection 22 against an edge 33 of the hole 15 prevents further advancing. Even while before reaching the hole 15 the projection 22 slides along in the groove 11, the part of the plate 29 carrying the adhesive tape 32 comes into contact with the step 18. Since at this time the adhesive tape 32 is still covered with a protective film and does not stick the plate 29 slides upwards along the step 18 until the lower edge 31 engages in the hook 30. Accordingly, at the moment at which the projection 22 under the pressure of the spring 23 engages in the hole 15, the screen 20, through the engagement of the lower edge 31 into the hook 30, is secured on the outer wall 1 in a non-rotating manner.

As is visible in FIG. 3, the protective film includes a strap 35, which projects on the edge of the adhesive tape 32 facing away from the base plate 21 and is long enough so that an end of the strap 35 between the step 18 and the plate 29 projects forward between the outer wall 1 and the windshield 6 and can be gripped and pulled out in order to make possible gluing the screen 20.

Figure 5:
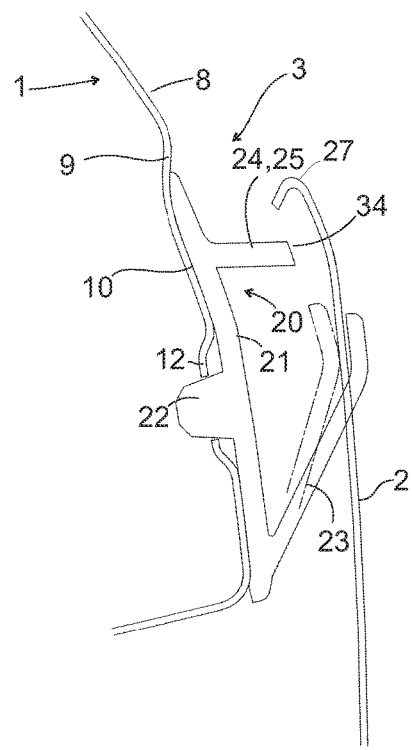
FIG. 5 is a section in a section plane running approximately in longitudinal direction of the A-pillar through the screen.

FIG. 5 shows a section through the finish-assembled screen 20 along a section plane orientated in longitudinal direction of the A-pillar. Below the exposed region 8 of the outer wall 1, the step 9 and the apron 10 follow and the apron 10 is completely, the step 9 partly covered by the base plate 21 of the screen. Accordingly, only an edge region of the step 9 is visible in the joint 3 which is accessible easily enough from the outside in order to be painted in the same quality as the exposed region 8. The bulkhead 24, which extends at a low distance from the upper edge 27 of the fender 2 parallel to the same, conceals the intermediate space between the apron 10 and the fender 2 from the views of a beholder and covers in particular the spring 23. The bulkhead 24 does not touch the fender 2 but extends far enough under the flanged-over upper edge 27 so that an outer edge 34 of the bulkhead 24 is not visible from the outside.

Figure 6:
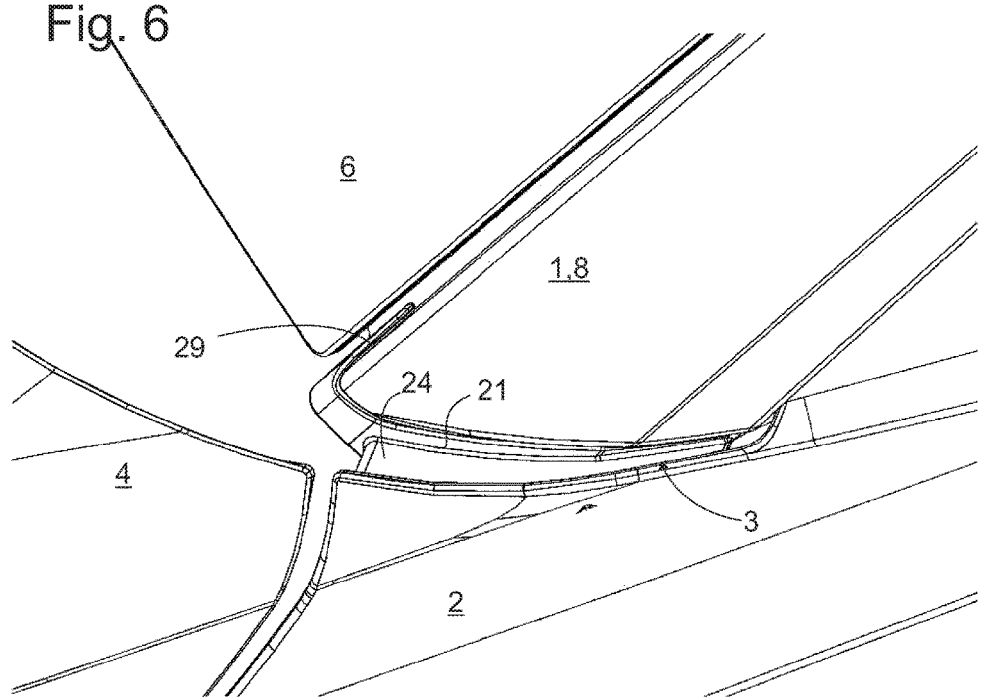
FIG. 6 is a perspective view from the top of the region of the vehicle body shown in FIG. 1 with mounted screen.

FIG. 6 shows a view steeply from above into the joint 3. The base plate 21 of the screen 20 in this case forms an almost flush extension of the exposed region 8 of the outer wall 1. The outer wall of the bulkhead 24 is concealed under the fender 2. The plate 29 engages into a joint between the outer skin 1 and the windshield 6 where it is glued to the step 18.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle body comprising:
   first and second outer skin parts bordering at a joint, wherein the first outer skin part engages into an interior of the vehicle body and overlaps with the second outer skin part; and
   a screen inserted between the first and second outer skin parts into engagement with a guiding contour of the first outer skin part which runs in the direction of the joint.

2. The vehicle body according to claim 1, wherein the first outer skin part comprises an outer wall of a pillar carrying the roof of the vehicle.

3. The vehicle body according to claim 1, wherein the second outer skin part comprises a fender.

4. The vehicle body according to claim 1, further comprising a moveable flap bordered by an end of the joint.

5. The vehicle body according to claim 1, wherein the screen comprises an adhesive fixing the screen to at least one of the first and second outer skin parts.

6. The vehicle body according to claim 5 wherein the adhesive comprises a double-sided adhesive tape.

7. The vehicle body according to claim 1 wherein the first outer skin part comprises an apron.

8. The vehicle body according to claim 7, further comprising a retainer formed between the apron and the screen for locating the screen in a stop position when the screen is inserted between the apron and the second outer skin part.

9. The vehicle body according to claim 8, wherein the apron at an end of the guiding contour comprises at least one of a wall or an edge, which the screen abuts in the stop position.

10. The vehicle body according to claim 8, wherein further comprising a hook carried on the screen which abuts an edge of one of the first and second outer skin parts running transversely to the joint.

11. The vehicle body according to claim 1, herein the guiding contour is a groove configured to engage a projection of the screen.

12. The vehicle body according to claim 11, wherein the groove has a pocket end, on which the groove is locally deepened.

13. The vehicle body according to claim 11, wherein the first outer skin panel comprises a hole configured to engage the projection.

14. The vehicle body according to claim 1, wherein the screen comprises a base plate that lies against the apron and covers a bottom of the joint.

15. The vehicle body according to claim 14, wherein a spring projecting from the base plate is held under tension by way of contact with the second outer skin part.

16. The vehicle body according to claim 14, bulkhead projects from the base plate towards the second outer skin part.

17. The vehicle body according to claim 16, wherein the course of the bulkhead follows the course of an edge of the second outer skin part which delimits the joint.

\* \* \* \* \*